UNITED STATES PATENT OFFICE.

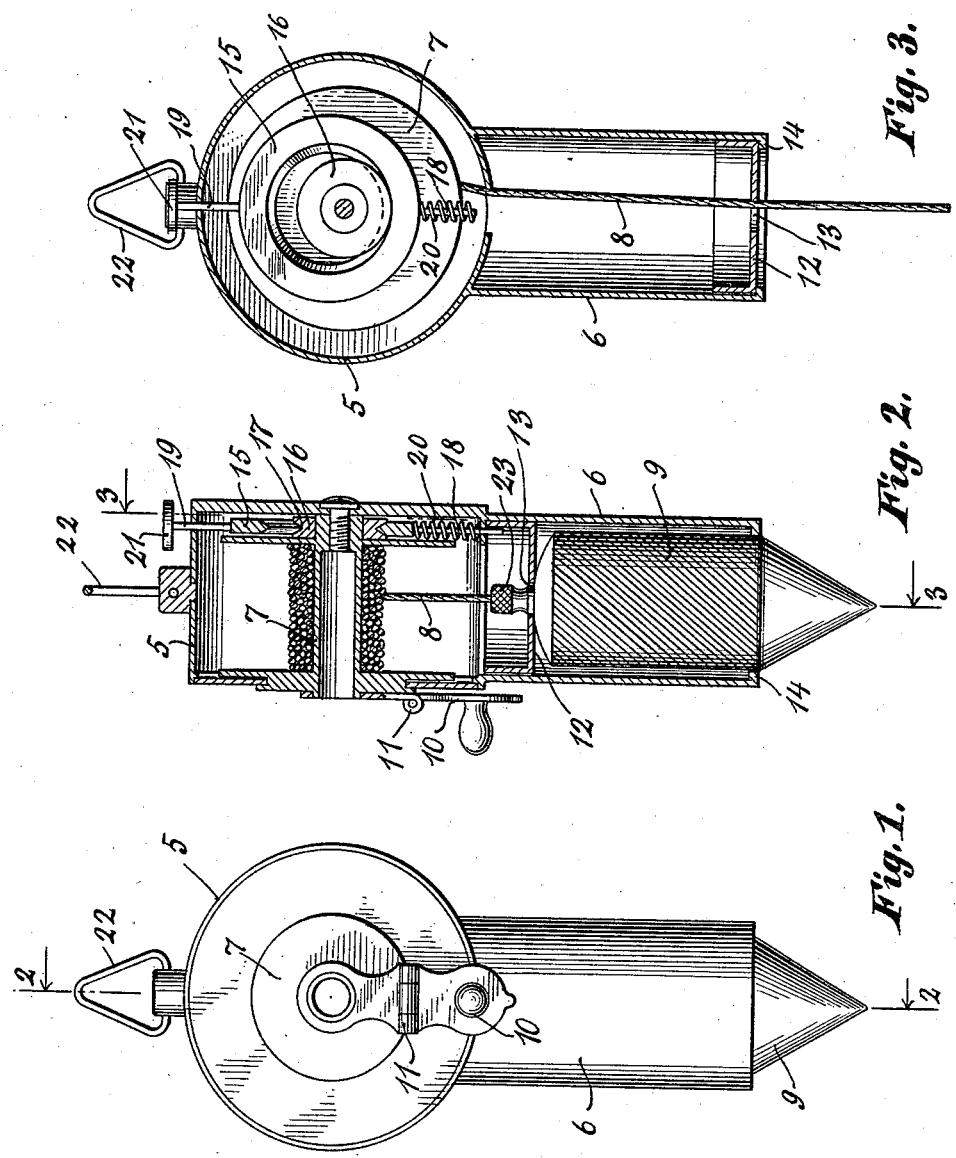

ALBERT E. BURNS, OF BOSTON, MASSACHUSETTS, ASSIGNOR OF ONE-HALF TO LAWRENCE HOWARD, OF BOSTON, MASSACHUSETTS.

PLUMB-BOB.

1,043,295.  Specification of Letters Patent.  Patented Nov. 5, 1912.

Application filed May 20, 1912. Serial No. 698,547.

*To all whom it may concern:*

Be it known that I, ALBERT E. BURNS, a subject of the King of Great Britain, residing at Boston, in the county of Suffolk and State of Massachusetts, have invented certain new and useful Improvements in Plumb-Bobs, of which the following is a specification.

This invention has for its object to provide a novel and improved holder for plumb-bobs, whereby the line is effectually prevented from getting tangled up and knotted.

The invention also has for its object to provide the holder with a reel or spool on which the line is wound, together with improved means for controlling the paying out of the line.

A further object of the invention is to provide a holder of the kind stated which is simple and compact in construction and which can be easily carried in the pocket.

Another object of the invention is to provide a guide which centers the string.

With these objects in view, the invention consists in a novel construction and arrangement of parts to be hereinafter described and claimed, reference being had to the accompanying drawing, in which—

Figure 1 is an elevation of the device; Fig. 2 is a vertical section on the line 2—2 of Fig. 1, and Fig. 3 is a vertical section on the line 3—3 of Fig. 2.

Referring specifically to the drawing, 5 denotes a cylindrical casing having a cylindrical side extension 6. The casing contains a reel 7 on which is adapted to be wound the line 8 which carries the bob 9. The reel is supported by the end walls of the casing and is fitted with a handle 10 which is pivoted, as indicated at 11, so that it may be folded. The line 8 extends through an aperture in the side wall of the casing 5 and passes through the extension 6, in which latter is slidably mounted a disk 12 having a central opening 13 through which the line passes. At the outer end of the extension 6 is an annular internal shoulder 14 which prevents the disk 12 from dropping out. The reel 7 has one of its ends provided with a disk 16 which is encircled by a brake-ring 15. The disk has a V-shaped circumferential groove 17 in which is adapted to seat the correspondingly shaped brake-ring 15. The brake-ring has diametrically opposite, outwardly extending stems 18 and 19, respectively. The stem 18 extends through an aperture in that portion of the side wall of the casing from which the extension 6 projects, and between said wall and the ring 15 is interposed a spring 20, which latter is coiled around the stem, and serves to normally hold the ring in braking position. The stem 19 extends through an aperture in the top portion of the side wall of the casing and has on the outside of the latter a button or finger piece 21. To the top of the casing is connected a ring 22 for hanging up the device when plumbing.

When the device is not in use, the line 8 will be wound on the reel 7 until the bob 9 enters the extension 6, the latter therefore serving as a housing for the bob. The opening 13 in the disk 12 is large enough to accommodate the knob 23 on the top of the bob, and the length of the housing is such that the entire bob, except the point thereof, is inclosed. When the bob enters the housing, its upper end strikes the disk 12, and the latter slides upward in the housing, so as not to interfere with the entry of the bob into the latter. To pay out the line 8, it is necessary only to take hold of the casing 5, with the bob pointing downward, and then to push the button 21 inward, whereupon the reel is released, and the weight of the bob causes the line to automatically wind off the reel. The line can be instantly checked by releasing the button, whereupon the brake-ring 15 is applied to stop the reel. The brake must also be released when the line is being wound up. The disk 12 centers and guides the line and prevents it from getting tangled when it is wound up or unwound.

The structure herein described is devoid of complicated parts to get out of order, and the device effectually serves the purpose for which it is designed. The line can be easily controlled, and when it is wound up, and the bob is inclosed in the housing, the entire device is in a small and compact form and can be conveniently carried in the pocket.

I claim:

1. The combination of a plumb-line and a bob, a casing, a reel in the casing to receive the line, operating means for the reel, a housing for the bob extending from the casing, and a disk slidably mounted in the housing, said disk having a central opening through which the line loosely passes.

2. The combination of a plumb-line and a bob, a casing, a reel in the casing to receive the line, operating means for the reel, a housing for the bob, said housing extending from the casing and having an internal flange at its outer end, and a disk slidably mounted in the housing, said disk having a central opening through which the line loosely passes.

3. The combination of a plumb-line and a bob, a casing, a reel in the casing to receive the line, operating means for the reel, a housing for the bob extending from the casing, and a centering device for the line slidably mounted in the housing, and through which device the line loosely passes.

4. The combination of a plumb-line and a bob, a casing, a reel in the casing to receive the line, a disk carried by the reel, said disk having a circumferential groove, a ring encircling the disk and movable to enter the groove thereof, diametrically opposite outwardly extending stems on the ring, said stems extending through the casing wall, and one of said stems being provided on the outside of the casing with operating means, and a spring coiled around the other stem between the ring and the casing wall.

In testimony whereof I affix my signature in presence of two witnesses.

ALBERT E. BURNS.

Witnesses:
LAWRENCE HOWARD,
SAMUEL T. PARKER.

---

Copies of this patent may be obtained for five cents each, by addressing the "Commissioner of Patents, Washington, D. C."